United States Patent [19]

Dellis

[11] Patent Number: 4,785,495
[45] Date of Patent: Nov. 22, 1988

[54] MOLDABLE HAND GRIPS

[76] Inventor: Edward A. Dellis, 1360 S.W. 17th St., Boca Raton, Fla. 33486

[21] Appl. No.: 86,386

[22] Filed: Aug. 17, 1987

[51] Int. Cl.$^4$ .................. B29C 33/40; B29C 71/02; A63B 53/14

[52] U.S. Cl. .................. 16/111 R; 16/DIG. 12; 16/DIG. 19; 81/489; 264/222; 264/322; 264/345; 264/DIG. 30; 273/81.4

[58] Field of Search ............. 16/111 A, 111 R, 114 R, 16/DIG. 12, DIG. 19; 81/20, 22, 177.1, 489; 264/222, 279.1, 322, 343, 345, DIG. 30; 273/75, 81.4

[56] References Cited

U.S. PATENT DOCUMENTS

| | | | |
|---|---|---|---|
| 412,479 | 10/1889 | Davis | 264/DIG. 30 |
| 2,121,718 | 6/1938 | Sweetland | 264/343 |
| 2,205,769 | 6/1940 | Sweetland | 16/110 R |
| 2,226,468 | 12/1940 | Kimmich | 273/75 |
| 3,597,053 | 8/1971 | Mastman | 264/322 |
| 4,044,762 | 8/1977 | Jacobs | 264/DIG. 30 |
| 4,696,842 | 9/1987 | Doubt | 273/75 |

FOREIGN PATENT DOCUMENTS

| | | | |
|---|---|---|---|
| 2634656 | 2/1978 | Fed. Rep. of Germany | 16/110 R |
| 27827 | 11/1897 | United Kingdom | 273/81.4 |
| 2169839 | 7/1986 | United Kingdom | 273/75 |

*Primary Examiner*—Nicholas P. Godici
*Assistant Examiner*—Edward A. Brown
*Attorney, Agent, or Firm*—Alvin S. Blum

[57] ABSTRACT

Hand grips for applying to motorcycles, bicycles, tools, golf clubs, fishing rods, guns, crutches and the like can be custom molded to fit exactly to the contours of the user's hand. The grip is put in place and then heated with a hair dryer. The user grasps the hot grip and then releases it. The hot grip conforms or molds to the shape of the user's hand and retains that conformation upon cooling. The grip may incorporate special surface properties for comfort and adhesive and resilient inner layers for enhanced function.

20 Claims, 2 Drawing Sheets

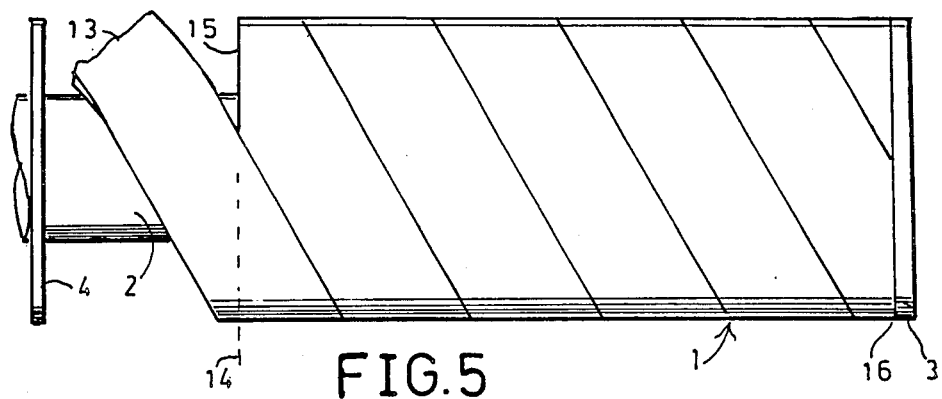
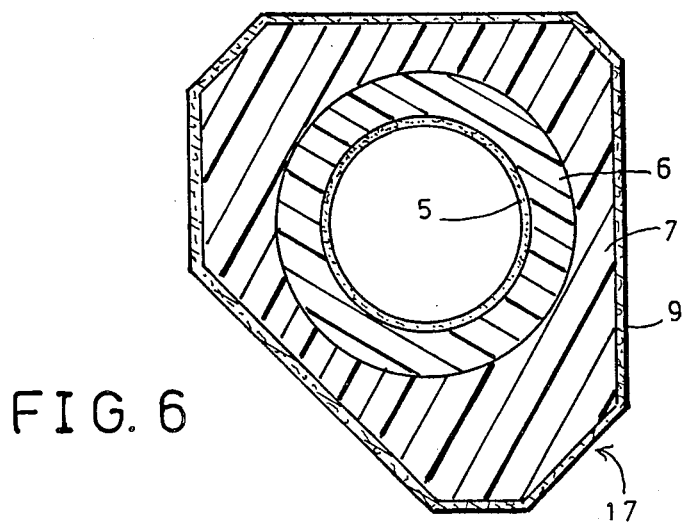

MOLDABLE HAND GRIPS

This invention relates to hand grips and more particularly to coverings for handles that can be molded to the contours of the hand of an individual user.

To make the most effective use of an implement that must be grasped by the hand, the implement should conform to the shape of the hand grasping it.

French Pat. No. 1,112,170 and U.S. Pat. No. 4,16,051 address the problem by providing specially contoured handles related to the anatomy of the hand. Unfortunately, each hand is unique in its size and shape, even though general structure is consistent. If a specially contoured handle is prepared for the average person closing the hand to a certain extent, it will be less suitable for those deviating from the mean. Another common approach is to provide a contoured grip with a resilient outer layer of material to conform to the individual differences by deforming. If this layer is easily deformed, the implement is not firmly held unless the grip is grasped tightly enough to squeeze all of the resilience out of the handle. This may cause fatigue of the hand muscles.

Adjustable plastic shoes and insoles that can be formed to the individual foot after heating to soften the plastic are described in U.S. Pat. Nos. 3,895,405 and 4,463,761.

SUMMARY OF THE INVENTION

It is an object of the invention to provide hand grips that can be molded to the unique shape of the hand of the user by heating to a temperature that can be safely grasped by the user and grasping the heated hand grip and releasing.

It is another object to provide a hand grip as described above that can be remolded by simply reheating and grasping while hot.

The moldable and remoldable hand grip of the invention has a surface with desirable properties for a hand grip surface such as high friction, moisture absorbing, resistance to environmental degradation, attractive appearance. It has an innermost layer for adhesion to the implement upon which the hand grip is installed such as a golf club, fishing rod, gun, bicycle, motorcycle, tool and the like. A resilient spacer layer below the formable layer may be provided for shock and vibration resistance.

The grip may be in the form of a tape or sheet to be wrapped around the handle of the implement such as a rifle stock or it may be an extruded tubular form to be slipped over a golf club. Alternatively a molded hand grip such as for a motorcycle handlebar may be provided.

These and other objects, features and advantages of the invention will become more fully apparent when the following detailed description of the preferred embodiments of the invention is read in conjunction with the accompanying drawings.

BRIEF DESCRIPTION OF THE DRAWINGS

FIG. 5 is a front elevation illustrating the tape embodiment of the invention being applied.

FIG. 6 is a cross section of a profile coextrusion embodiment of the invention.

DETAILED DESCRIPTION OF PREFERRED EMBODIMENTS

Figure 1:
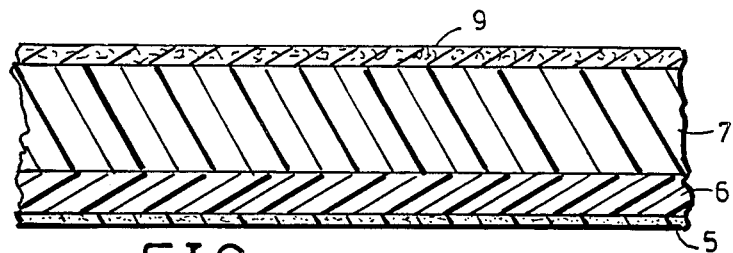
FIG. 1 is a longitudinal section through a portion of the formable grip before heating.
Figure 2:
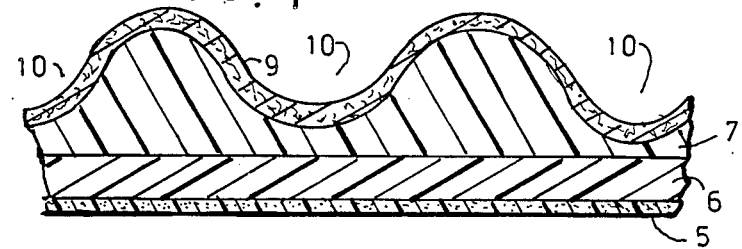
FIG. 2 is a longitudinal section through the portion of FIG. 1 after heating and forming by gripping.
Figure 3:
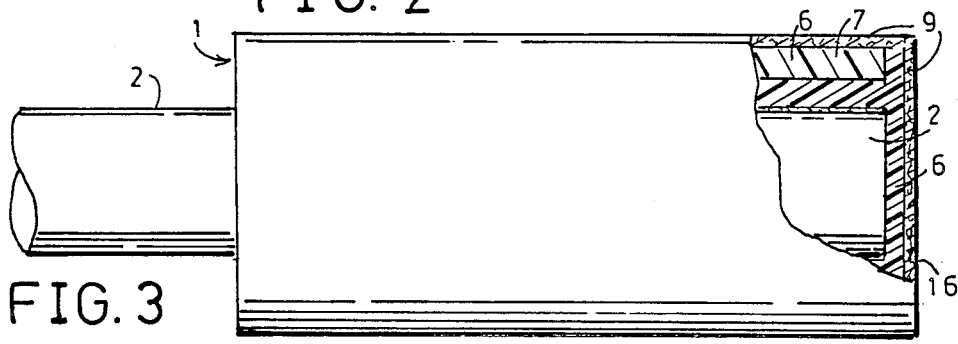
FIG. 3 is a front elevation of the hand grip of the invention in place before heating and forming, with a portion broken away.
Figure 4:
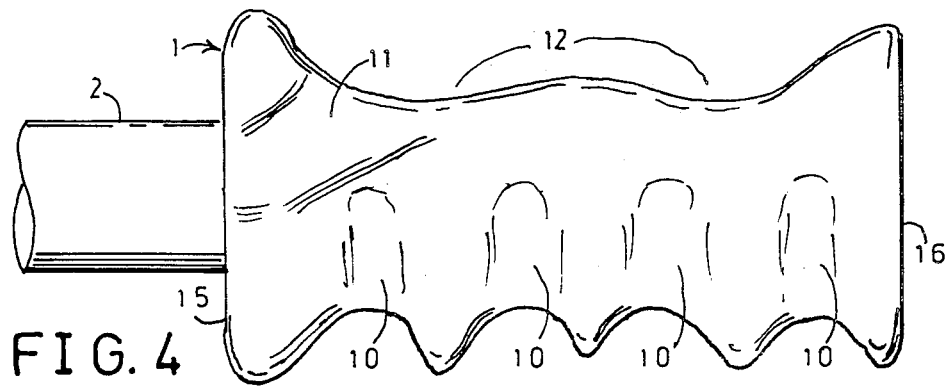
FIG. 4 is the same view as FIG. 3 after heating and forming the hand impression by gripping.

Referring now first to FIG. 3, a sleeve-like hand grip 1 of the invention slides onto motorcycle handlebar 2. Heat is then applied to hand grip 1 with a hair dryer. The person who will use the motorcycle and for whom the hand grips are to be customized then grips the hand grips in the position of ordinary use and then releases them. The hand grip takes the permanent shape illustrated in FIG. 4, with the grip now contoured to the hand with the impressions formed by the palm 12, the thumb 11, and the fingers 10 as shown. Furthermore, the hand grip is now firmly cemented to the handlebar 2 by the hot melt adhesive inner layer 5 of the hand grip. The hand grip 1 is covered by a surface layer 9 that may be a poromeric plastic, a flocked surface of leather fibers or other material that will not become slippery when wet with perspiration. Beneath the surface layer 9 is a heat formable plastic layer 7 that retains its shape at room temperature, but becomes plastic and formable at temperatures easily reached by a hair dryer. As shown in the details of FIG. 1 before forming and FIG. 2 after forming, the pressure of the fingers has forced the plastic 7 out of the regions of greatest pressure, leaving finger impressions 10.

It may be desirable to provide a layer of material 6 that is not formable at the hair dryer temperature, to provide a minimum diameter of hand grip regardless of pressure. This ensures that all of the material is not squeezed out from beneath the fingers. This layer 6 may be somewhat resilient to prevent the transmission of shock and/or vibration to the hand and its resistance to deformation with heat provides a fixed thickness of shock or vibration resistant material. As shown in FIG. 3, this fixed layer 6 may also form a rear wall 16 of the hand grip.

The hand grip 1 may take the form of a tube with rear wall as in FIG. 3. It may take the form of a tube 17 having a cross section as shown in FIG. 6. This may be formed by a profile coextrusion process with hot melt adhesive layer 5, resilient layer 6, heat deformable layer 7 and surface layer 9 all formed in the same extrusion process. The flocking of the surface layer 9 may take place before the outer surface cools. As shown, the inner cavity generally conforms to the size and shape of the shaft onto which the grip is to be applied, e.g. a golf club or fishing rod, and the outer contour more closely conforms to the closed hand with enough extra substance for forming impressions.

There may be applications where the grip is best wrapped onto the implement, such as in applying it to the handle of a crutch or the stock of a rifle. In that case a sheet or tape material having the cross section of FIG. 1 may better serve the purpose.

FIG. 5 shows how a tape 13 of the invention is applied to the handlebar 2. The tape was wrapped from the rear end forward, then the rear edge 16 was trimmed square and shouldered plug 3 was cemented in place. Now the front edge 15 is being trimmed at the cut line 14. After trimming, the front washer 4 will be cemented against the front edge 15 for a finished appearance. The tape or sheet embodiment may use a pressure sensitive adhesive layer 5 for easier application.

The resilient layer 6 may facilitate a snug fit of the hand grip on the implement in any of the embodiments.

In certain applications, the inner resilient layer 6 may not be necessary or desirable. Ethylene vinyl acetate resins of the "Elvax" series, a registered trademark of the DuPont Company, have been found to have the desired properties for moldability and remoldability at hair dryer temperatures, although many other resins may be used for this purpose.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. Hand grip means capable of being attached to the handle of a hand-held implement and also capable of being molded to fit the hand of an individual person, comprising:
   a. a heat moldable layer having an inner and an outer surface and capable of plastic forming to the shape of a grasping hand under the pressures of said grasping hand when heated to a temperature that can be grasped safely by said hand and that is capable of retaining said shape after cooling to room temperature;
   b. a surface means covering said outer surface, said surface means including a frictional surface for comfortable direct contact with said hand; and
   c. a resilient layer attached to the inner surface of said heat moldable layer, said resilient layer not heat moldable at the temperatures used for molding said heat moldable layer and having resilience and vibration and shock absorbing properties for better fitting of said hand grip means to said implement and to provide a fixed thickness of shock and vibration resistance for reduced trauma to said hand in the use of said implement.

2. The hand grip means according to claim 1 further comprising implement attaching means attached to the inner surface of said resilient layer for securely attaching said grip means to said implement.

3. The hand grip means according to claim 2 in which said implement attaching means is a hot melt adhesive.

4. The hand grip means according to claim 1 in which said surface means includes a moisture absorbing surface means.

5. The hand grip means according to claim 1 in which said surface means includes a poromeric material.

6. The hand grip means according to claim 1 in which said surface means includes a flocked material.

7. The hand grip means according to claim 1 in which said surface means includes leather.

8. The hand grip means of claim 1 in the form of an elongate strip or tape for wrapping around the handle of said implement.

9. The hand grip according to claim 2 in the form of an elongate strip or tape for wrapping around the handle of said implement.

10. The hand grip means according to claim 9 in which said implement attaching means is a hot melt adhesive.

11. The hand grip means according to claim 9 in which said implement attaching means is a pressure sensitive adhesive.

12. The hand grip means of claim 1 in the form of an elongate tube having an inner diameter approximating the outer diameter of said implement.

13. The hand grip means according to claim 12 including a rear wall sealing off said tube.

14. The hand grip means according to claim 2 in the form of an elongate tube having an inner diameter approximating the outer diameter of said implement.

15. The hand grip means according to claim 14 including a rear wall sealing off said tube.

16. The hand grip means according to claim 9 in which said surface means includes a moisture absorbing means.

17. The hand grip means according to claim 9 in which said surface means includes a poromeric material.

18. The hand grip means according to claim 9 in which said surface means includes a flocked material.

19. The hand grip means according to claim 9 in which said surface means includes leather.

20. The hand grip means according to claim 13 in which said surface means includes a poromeric material.

* * * * *